United States Patent
Nakagawa

(10) Patent No.: US 7,926,466 B2
(45) Date of Patent: Apr. 19, 2011

(54) ENGINE CONTROL DEVICE, ENGINE CONTROL METHOD, AND MOTORCYCLE

(75) Inventor: Yoshitomi Nakagawa, Shizuoka (JP)

(73) Assignee: Yamaha Hatsudoki Kabishiki Kaisha, Shizuoka-ken (JP)

( * ) Notice: Subject to any disclaimer, the term of this patent is extended or adjusted under 35 U.S.C. 154(b) by 206 days.

(21) Appl. No.: 12/340,463

(22) Filed: Dec. 19, 2008

(65) Prior Publication Data

US 2009/0171552 A1 Jul. 2, 2009

(30) Foreign Application Priority Data

Dec. 27, 2007 (JP) .................................. 2007-336687

(51) Int. Cl.
*F02P 5/00* (2006.01)
(52) U.S. Cl. ......... 123/406.23; 123/406.25; 123/406.35; 123/406.52; 123/406.58
(58) Field of Classification Search .................. 123/399, 123/406.11, 406.23–406.25, 406.35, 406.47, 123/406.5, 406.52, 406.58, 406.59; 701/103
See application file for complete search history.

(56) References Cited

U.S. PATENT DOCUMENTS

| 4,487,183 A * | 12/1984 | Petrie ........................ 123/406.59 |
| 6,009,865 A * | 1/2000 | Herndon et al. ............... 123/601 |
| 6,082,325 A * | 7/2000 | Digeser et al. ................. 123/299 |
| 6,161,530 A * | 12/2000 | Kakizaki et al. ............... 123/674 |
| 6,293,246 B1 * | 9/2001 | Tanahashi et al. ............. 123/305 |
| 6,827,051 B2 * | 12/2004 | Kawasaki et al. ........... 123/90.15 |
| 7,079,941 B2 * | 7/2006 | Tetsuno et al. ................. 701/112 |
| 7,204,222 B2 * | 4/2007 | Yamauchi et al. .......... 123/179.4 |
| 7,559,304 B2 * | 7/2009 | Kataoka et al. ............. 123/179.4 |
| 2003/0010022 A1 * | 1/2003 | Suzuki ............................ 60/286 |
| 2007/0295290 A1 * | 12/2007 | Cao .................................. 123/64 |

FOREIGN PATENT DOCUMENTS

JP 2006-207565 A 8/2006

* cited by examiner

*Primary Examiner* — John T Kwon
(74) *Attorney, Agent, or Firm* — Dickstein Shapiro LLP

(57) ABSTRACT

An engine control device includes an engine revolution speed information acquisition device for acquiring the revolution speed of an engine, an accelerator opening sensor for detecting the opening of an accelerator operated by a rider of a vehicle mounted with the engine, a throttle opening control unit configured to control an opening of a throttle of the engine on the basis of the opening of the accelerator and other information, and an ignition control unit configured to limit ignition at a crank position before a compression top dead center on the basis of the opening of the accelerator and the revolution speed of the engine.

18 Claims, 4 Drawing Sheets

ENGINE CONTROL DEVICE, ENGINE CONTROL METHOD, AND MOTORCYCLE

PRIORITY INFORMATION

This patent application is based on and claims priority under 35 U.S.C. §119 to Japanese Patent Application No. 2007-336687, filed on Dec. 27, 2007, the entire contents of which is hereby expressly incorporated by reference.

TECHNICAL FIELD

The present invention relates to an engine control devices, engine control methods and motorcycles, and more particularly control devices and methods for preventing reverse rotation operation of an engine.

BACKGROUND ART

It is conventionally known that an engine will be reversely rotated by increased gas pressure in a combustion chamber, and in particular, when the number of revolutions of the engine is relatively low.

As for this problem, in an ignition control device of an engine described in Japanese Unexamined Patent Application Publication No. 2006-207565 to be described below, the reverse revolution of the engine is prevented by forcibly causing a misfire when the number of revolutions of the engine is lower than a threshold value determined according to the present load of the engine. Moreover, according to this device, the threshold value of the number of revolutions of the engine at which the misfire is caused is determined according to the load of the engine, so that forcibly causing a useless misfire can be prevented. A measurement value received from a throttle sensor, for example, is used as the load of the engine.

An output signal from a throttle sensor corresponds to the extent of the throttle opening which in turn relates to the amount of gas pressure present in the combustion chamber and correlates to some extent with the reverse revolution of the engine. However, it is difficult to determine whether a throttle opening will decrease or increase in the future based on the output signal of the throttle sensor. In a state where the throttle opening will decrease in the future and in a state where the throttle opening will increase in the future, even if the number of revolutions of the engine is the same, the probability that the engine will be reversely revolved may be different. However, the ignition control device disclosed in Japanese Unexamined Patent Application Publication No. 2006-207565 does not consider the difference in probability between the two states and hence does not necessarily predict the reverse revolution of the engine correctly.

SUMMARY

The present invention has been made in view of the above-described problems. To this end, one object of the invention is to provide an engine control device and method that can correctly predict a state where an engine will be reversely revolved and which can perform ignition control of the engine according to the predicted result. Another object is to provide a motorcycle employing an engine control system or method described herein. Other objects, advantages, and aspects of the invention will become apparent from the description that follows together with the appended drawings.

To solve, or at least mitigate, the above-mentioned problems, in one embodiment, an engine control device is provided comprising a device for acquiring the revolution speed of an engine, an accelerator opening sensor for detecting an opening of an accelerator operated by a rider of a vehicle equipped with the engine, a throttle opening control unit for controlling the opening of a throttle of the engine on the basis of the opening of the accelerator and other information, and an ignition control unit for limiting ignition at a crank position before a compression top dead center on the basis of the opening of the accelerator and the revolution speed of the engine.

Moreover, a motorcycle may incorporate the engine control devices described herein. Furthermore, one embodiment of an engine control method according to the present invention includes the steps of acquiring the revolution speed of an engine, detecting the opening of an accelerator operated by a rider of a vehicle which includes the engine, controlling the opening of a throttle of the engine on the basis of the opening of the accelerator and other information, and limiting ignition at a crank position before a compression top dead center on the basis of the opening of the accelerator and the revolution speed of the engine.

In the above-described embodiments, the opening of the throttle is controlled on the basis of the opening of the accelerator and other information. For this reason, the opening of the accelerator is closely related to a subsequent opening of the throttle, and, as a result, a subsequent gas pressure in the combustion chamber. Thus, according to the present invention, ignition in a combustion chamber at the crank position before the compression top dead center may be limited according to the opening of the accelerator, so that a state where the engine will be reversely revolved can be correctly estimated and ignition control of the engine can be performed according to the estimate.

DETAILED DESCRIPTION

Hereinafter, an embodiment of the present invention will be described in detail with reference to the accompanying drawings. In the respective drawings, components and parts performing the same functions are denoted by the same reference symbols. Moreover, the present invention is not limited to the following embodiment.

Figure 1:
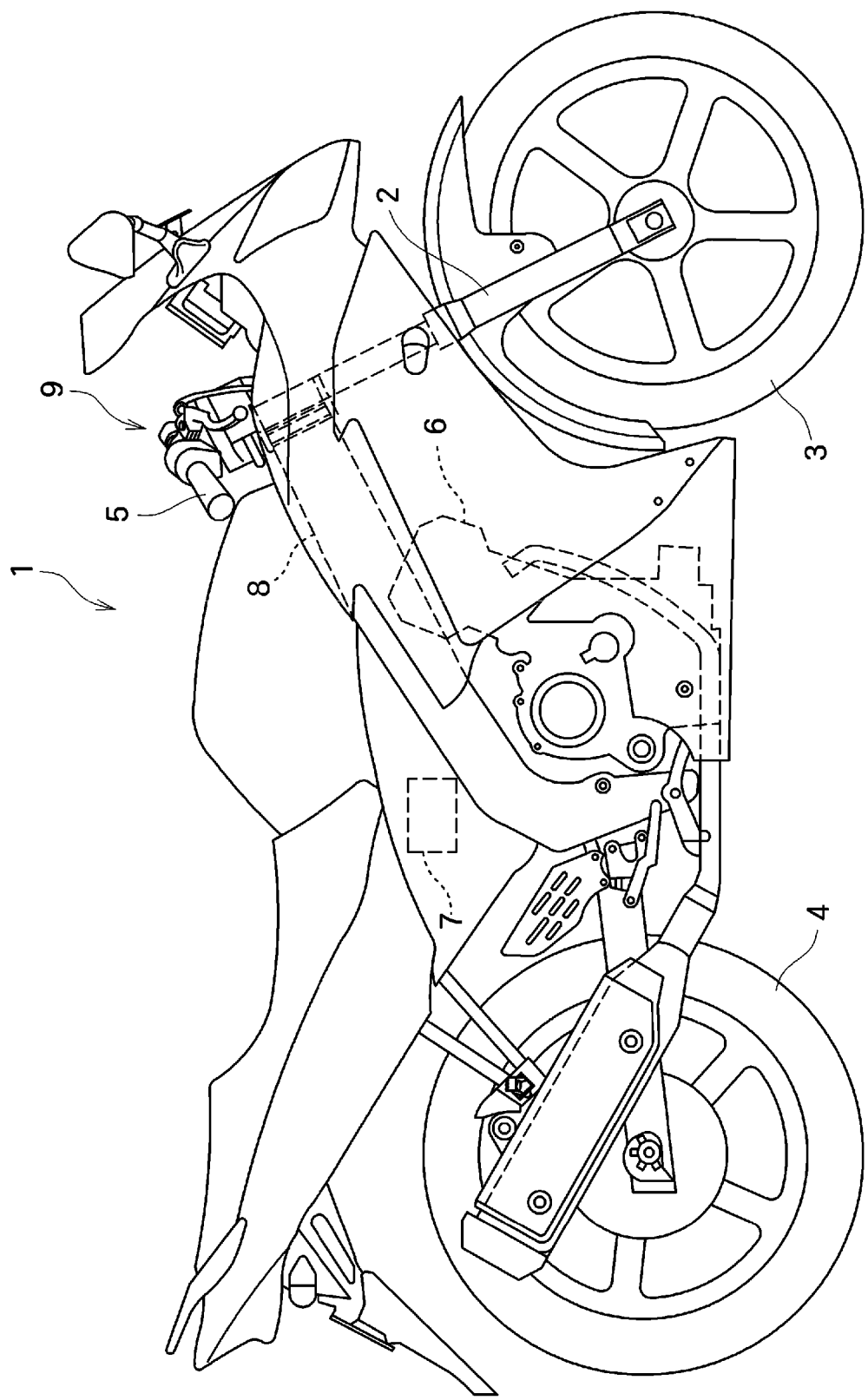
FIG. 1 illustrates the external appearance of a motorcycle according to an embodiment of the present invention.

FIG. 1 illustrates one embodiment of a motorcycle 1 equipped with an engine control device according to an embodiment of the present invention. As shown in FIG. 1, motorcycle 1 includes an engine 6 suspended from a main frame 8 which extends rearward and downward of a head pipe for supporting a front fork 2 in such a way as to allow steering of the front fork 2. The output of the engine 6 is transmitted to a rear wheel 4 by a chain. The front fork 2 rotatably supports a front wheel 3 and has a steering handlebar 9 fixed to its top portion. The steering handlebar 9 has an accelerator grip 5 fixed to its right end portion. A rider can control the direction the front wheel 3 is pointed by the use of the steering handlebar 9 and can adjust the output of the engine 6 by turning the accelerator grip 5.

Figure 2:
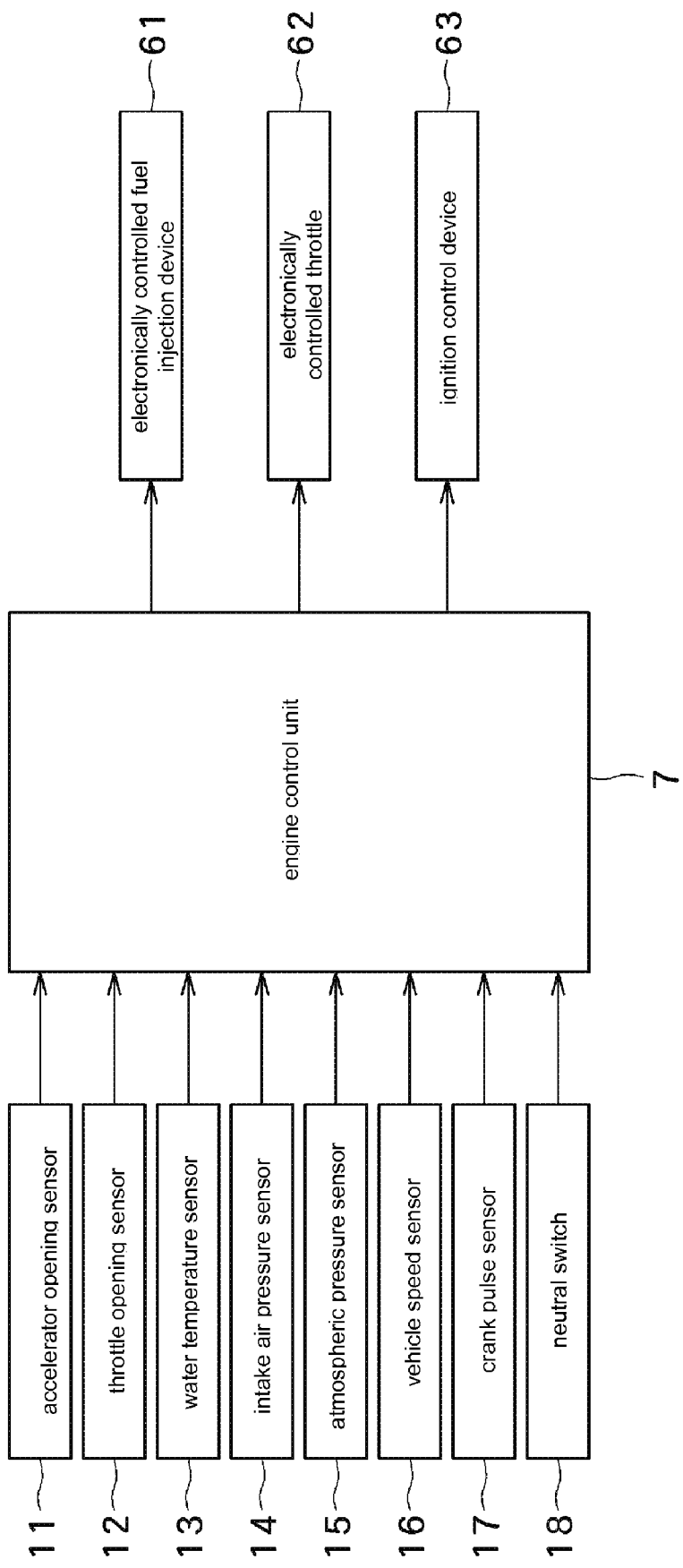
FIG. 2 is a block diagram of an engine control device of the motorcycle of FIG. 1.

FIG. 2 is a block diagram of one embodiment of an engine control device that may be used in motorcycle 1. As shown in the drawing, the engine control device of motorcycle 1 includes an engine control unit 7 constructed of one or more microprocessors. The engine control unit 7 is programmed to operate in accordance with control instructions stored in ROM (Read Only Memory) to realize an engine control method according to this embodiment. In other embodiments, the instructions may be stored in other forms of memory.

In the present embodiment, motorcycle 1 is provided with an accelerator opening sensor 11 for detecting the amount of operation (degree of turn in the present embodiment) of the accelerator grip 5 by the motorcycle rider, which reflects the accelerator opening, a throttle opening sensor 12 for detecting the opening of a throttle of the engine 6 (in the present embodiment, an electronically controlled throttle 62 to be described later), a water temperature sensor 13 for detecting the temperature of the cooling water of the engine 6, an intake air pressure sensor 14 for detecting pressure in an intake pipe, an atmospheric pressure sensor 15 for detecting the atmospheric pressure, a vehicle speed sensor 16 for detecting the running speed of the motorcycle 1, a crank pulse sensor 17 for detecting a crank pulse produced according to the revolution rate of the crankshaft of the engine 6, and a neutral switch 18 for detecting whether or not the transmission of the engine 6 is in a neutral state. Output signals representing the detection results from these detection devices (e.g., sensors) are fed as input signals into engine control unit 7. The accelerator opening sensor 11 may be disposed in the base portion of the accelerator grip 5 or may be disposed in a position separate from the accelerator grip 5 to monitor the movement of another member that is operatively connected to the accelerator grip 5 by, for example, a mechanical wire cable and the movement of which is representative of the accelerator opening.

Moreover, in this embodiment, the engine 6 of motorcycle 1 is provided with an electronically controlled fuel injection device 61, an electronically controlled throttle 62, and an ignition control device 63. The engine control unit 7 supplies these devices with control signals based on the input signals received from the respective detection devices.

The electronically controlled fuel injection device 61 electronically controls the amount of fuel in an air-fuel mixture to be supplied to the combustion chamber of the engine 6. The engine control unit 7 determines a fuel injection quantity on the basis of the outputs of the throttle opening sensor 12, the atmospheric pressure sensor 15, and the water temperature sensor 13. The engine control unit 7 then supplies the electronically controlled fuel injection device 61 with a control signal to supply the determined fuel injection quantity. The degree of opening of electronically controlled throttle 62 can be freely controlled by a DC motor according to a control signal from the engine control unit 7. The engine control unit 7 determines a final throttle opening on the basis of a three-dimensional map in which the output of the accelerator opening sensor 11, the revolution rate of the engine 6 (that is information to show the revolution speed of the engine 6 and which may be replaced by the number of revolutions per unit time, such as RPM) determined from the output of the crank pulse sensor 17, and the throttle opening are related to each other, and further on the basis of the outputs of the water temperature sensor 13 and the atmospheric pressure sensor 15. The engine control unit 7 supplies the electronically controlled throttle 62 with a control signal to realize the determined opening. Moreover, when it is determined from the neutral switch 18 that the transmission of the engine 6 is in a neutral state, the engine control unit 7 controls the electronically controlled throttle 62 to realize a throttle opening suitable for idling. The ignition control device 63 controls the ignition timing of when the air-fuel mixture in the combustion chamber is ignited by a spark plug of the engine 6. The engine control unit 7 determines the timing when a piston is positioned at a compression top dead center, that is, basic ignition timing on the basis of the outputs from the intake air pressure sensor 14 and the crank pulse sensor 17. Further, the engine control unit 7 advances or delays the actual ignition timing according to the engine revolution cycle and other information. In this embodiment, to prevent the crankshaft of the engine 6 from being reversely revolved, the engine control unit 7 compares a specified reverse revolution threshold value with the present engine revolution cycle and limits ignition at an advance position when the present engine revolution cycle is equal to or greater than the reverse revolution threshold value. Specifically, for example, the engine control unit 7 stops ignition in that combustion cycle or causes ignition at the timing when the piston is positioned at the compression top dead center or subsequent to that timing.

Further, in this embodiment, the reverse revolution threshold value is determined from the accelerator opening detected by the accelerator opening sensor 11. In this embodiment, as described above, the throttle opening is controlled on the basis of the accelerator opening and other information. For this reason, the accelerator opening closely relates to a future throttle opening, and, as a result, a future gas pressure in the combustion chamber. Thus, in this embodiment, the reverse revolution threshold value is determined in the following manner. As the accelerator opening detected by the accelerator opening sensor 11 becomes larger, the reverse revolution threshold value becomes smaller, and conversely, as the accelerator opening becomes smaller, the reverse revolution threshold value becomes larger. With this, when the accelerator opening is large and hence the future load on the engine 6 is estimated to be large, it is possible to limit advance ignition even if the engine revolution cycle is comparatively short. On the other hand, when the accelerator opening is small and hence the future load on the engine 6 is estimated to be small, it is possible to limit advance ignition only when the engine revolution cycle is relatively long. In this regard, when the number of revolutions of the engine 6 is used to provide information on the revolution speed cycle, it suffices that the reverse threshold value to be compared with the number of revolutions is determined in the following manner. As the accelerator opening detected by the accelerator opening sensor 11 becomes larger, the reverse threshold value becomes larger, and conversely, as the accelerator opening becomes smaller, the reverse threshold value becomes smaller.

Figure 3:
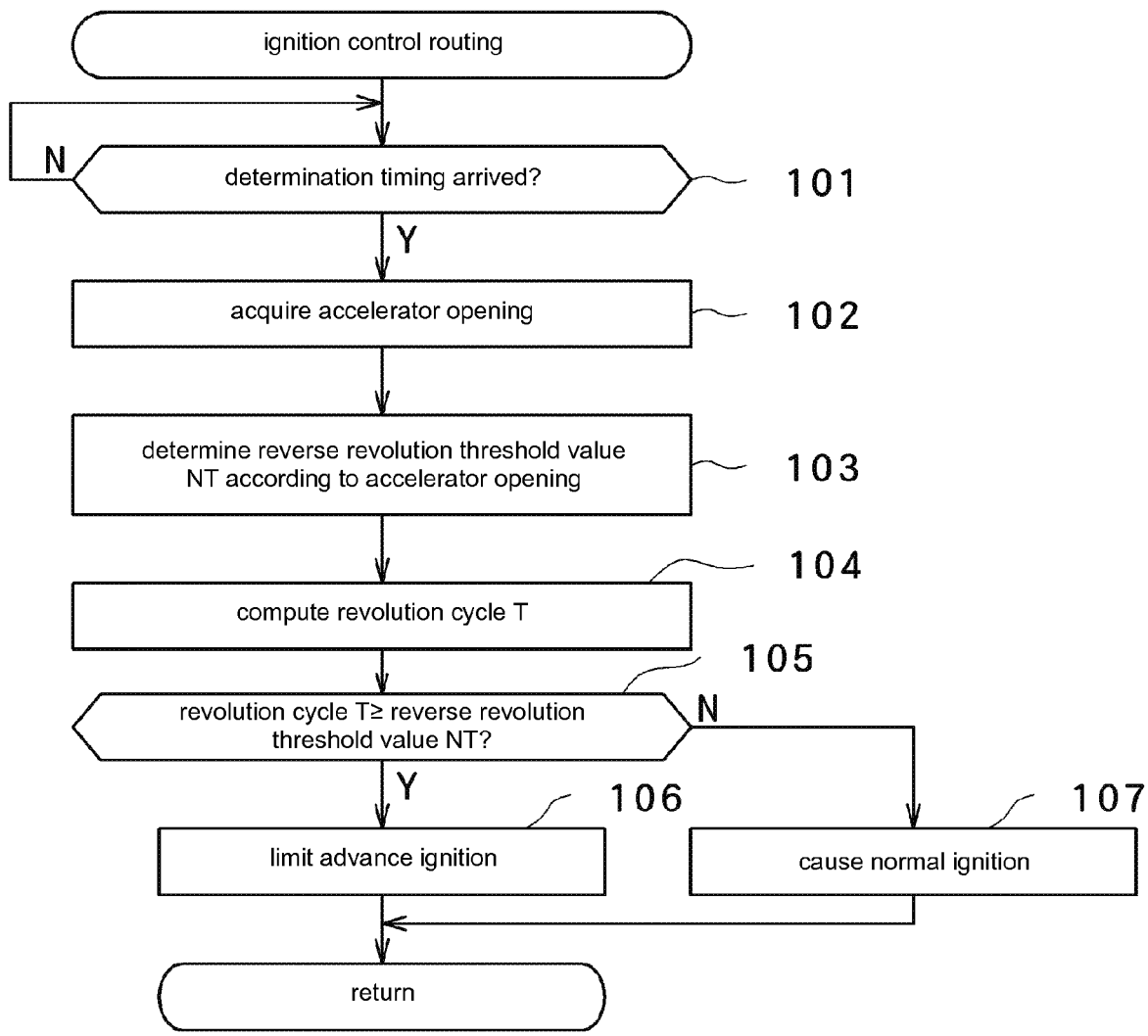
FIG. 3 is a flow chart showing one method of an ignition control processing.
Figure 4:
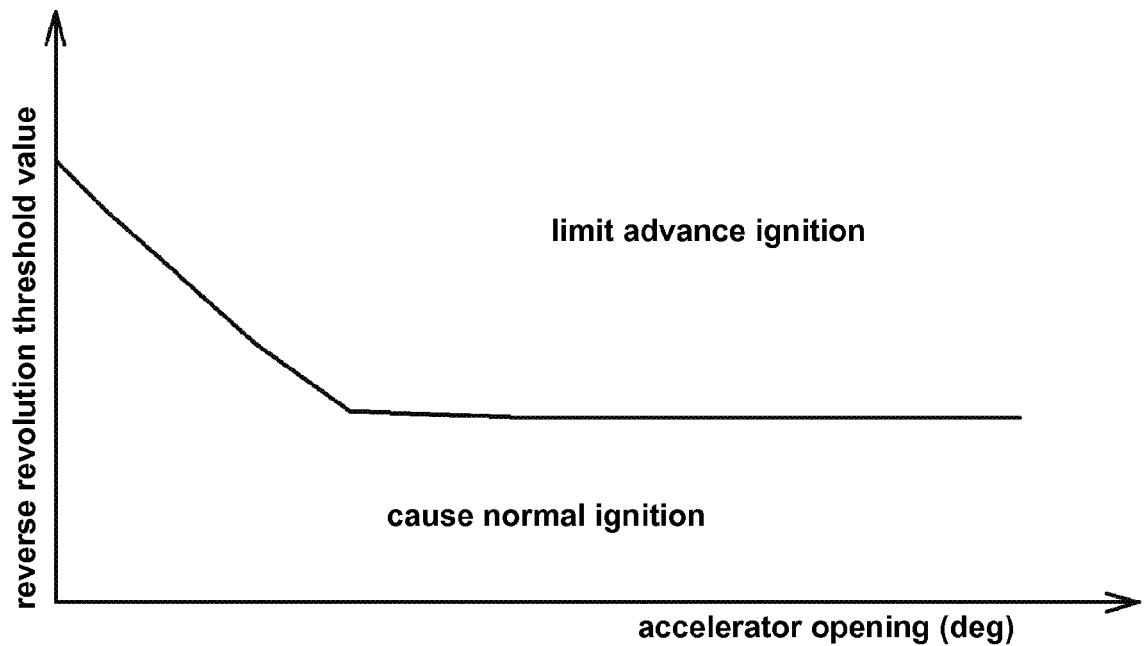
FIG. 4 is a graph showing a relationship between accelerator opening and reverse revolution threshold values established by an exemplary table.

FIG. 3 is a flow chart showing one method of an ignition control processing that may be carried out by the engine control unit 7. As shown in the drawing, the engine control unit 7 monitors the arrival of a determined ignition timing according to output signals from the crank pulse sensor 17 and the intake air pressure sensor 14 (step 101). For example, it suffices that the determined ignition timing be at a specified angular position before the position of the crankshaft where the piston of the engine 6 is positioned at the compression top dead center. Next, the engine control unit 7 acquires the accelerator opening based on an output signal from the accelerator opening sensor 11 (step 102) and determines a reverse revolution threshold value NT according to the acquired accelerator opening (step 103). If the accelerator opening is equal to or greater than a specified threshold value, the reverse revolution threshold value NT is assigned a specific value NT1. In one embodiment, if the accelerator opening is less than the specified threshold value, the reverse revolution threshold value NT is assigned a specified value NT2, whereby NT1<NT2. Alternatively, in a more preferred embodiment, a table establishing a relationship between the accelerator opening and the reverse revolution value, such as that shown in FIG. 4 wherein as the accelerator opening becomes larger the reverse revolution threshold value gradually becomes smaller, is stored in memory and the reverse revolution threshold value corresponding to the present accelerator opening is acquired with reference to this table.

Next, in step 104, the engine control unit 7 computes a revolution cycle T (time required for the crankshaft of the engine 6 to complete one revolution). In the present embodiment, the output signal from the crank pulse sensor 17 is used to make this computation. Then in step 105, the computed revolution cycle T is compared to the reverse revolution threshold value NT determined in step 103. If the computed revolution cycle T is equal to or greater than the reverse revolution threshold value NT, advance ignition of the engine 6 is limited (step 106). This can be realized, as described above, by stopping ignition of the engine 6, or by igniting the engine 6 at the timing when the piston is positioned at the compression top dead center or at a fixed timing subsequent to that timing. If the computed revolution cycle T is less than the reverse revolution threshold value NT, the engine 6 is normally ignited (step 107). The timing of igniting the engine 6 normally, as described above, is determined, for example, on the basis of the revolution cycle (or revolution speed) of the engine 6.

According to this embodiment, the state where the engine 6 is reversely revolved can be correctly predicted, and ignition control of the engine 6 can be performed according to the predicted result. In other words, in this embodiment, the throttle opening is controlled on the basis of not only the accelerator opening but also other information such as the cooling water temperature. For this reason, the accelerator opening is closely related to the future throttle opening, and, as a result, the subsequent gas pressure in the combustion chamber of the engine 6. Thus, in this embodiment, the threshold value for limiting ignition in the combustion chamber at a position of the crankshaft before the compression top dead center is determined not by the throttle opening but by the accelerator opening. In this manner, the state where the engine 6 is likely to be reversely revolved can be correctly predicted, and ignition control of the engine 6 can be performed according to the predicted result.

It is to be clearly understood that the above description was made only for purposes of an example and not as a limitation on the scope of the invention as claimed herein below.

What is claimed:

1. An engine control device comprising:
   an engine revolution speed information acquisition device for acquiring a revolution speed of an engine;
   an accelerator opening sensor for detecting an opening of a user-operated accelerator of the engine;
   a throttle opening control unit configured to control an opening of a throttle of the engine on the basis of the opening of the accelerator detected by the accelerator opening sensor; and
   an ignition control unit configured to limit ignition at a crank position before a compression top dead center on the basis of the opening of the accelerator detected by the accelerator opening sensor and the revolution speed of the engine acquired by the engine revolution speed information acquisition device.

2. The engine control device as claimed in claim 1, wherein the ignition control unit is configured to determine an engine revolution speed threshold value according to the opening of the accelerator and limits ignition at the crank position before the compression top dead center according to a comparison between the engine revolution speed threshold value and the revolution speed of the engine.

3. The engine control device as claimed in claim 2, wherein the engine revolution speed threshold value is selected between a specified first or second value according to a comparison between the opening of the accelerator and a specified accelerator opening threshold value.

4. The engine control device as claimed in claim 2, wherein the engine revolution speed threshold value is determined according to a map establishing a relationship between the opening of the accelerator and the engine revolution speed threshold value.

5. A motorcycle comprising the engine control device as claimed in claim 1.

6. An engine control method comprising the steps of:
   acquiring a revolution speed of an engine;
   detecting an opening of a user-operated accelerator of the engine;
   controlling an opening of a throttle of the engine on the basis of the detected opening of the accelerator; and
   limiting ignition at a crank position before a compression top dead center on the basis of the detected opening of the accelerator and the acquired revolution speed of the engine.

7. An engine control unit for an engine, the control unit comprising:
   one or more processors;
   an input for receiving a first detection signal representative of the revolution speed of the engine;
   an input for receiving a second detection signal representative of an opening of a user-operated accelerator of the engine;
   a first output for a throttle opening control device;
   a second output for an ignition control device;
   instructions for execution by the one or more processors to provide a control signal on the first output for controlling the throttle opening control device on the basis of the opening of the user-operated accelerator as determined from the second detection signal; and
   instructions for execution by the one or more processors to provide a control signal on the second output for controlling the ignition control device to limit ignition at a crank position before a compression top dead center on the basis of the opening of the user-operated accelerator as determined from the second detection signal and the revolution speed of the engine as determined from the first detection signal.

8. The engine control unit of claim 7, further comprising:
   an input for receiving a third detection signal representative of an intake air pressure sensor; and
   instructions for execution by the one or more processors to monitor the arrival of a determined ignition timing according to the first and third detection signals.

9. The engine control unit of claim 7, further comprising instructions for execution by the one or more processors for determining the accelerator opening based on the second detection signal.

10. The engine control unit of claim 9, further comprising instructions for execution by the one or more processors to determine a reverse revolution threshold value according to the determined accelerator opening.

11. The engine control unit of claim 10, wherein the instructions assign a first reverse revolution threshold value if the determined accelerator opening is equal to or greater than a specified threshold value.

12. The engine control unit of claim 11, wherein the instructions assign a second reverse revolution threshold value if the determined accelerator opening is less than the specified threshold value, the first reverse revolution threshold value being less than the second reverse revolution threshold value.

13. The engine control unit of claim 10, further comprising instructions for execution on the one or more processors to compute a revolution cycle time based on the first detection signal.

14. The engine control unit of claim 13, further comprising instructions for execution on the one or more processors to determine whether the computed revolution cycle time value is equal to or greater than the reverse revolution threshold value.

15. The engine control unit of claim 14, wherein the instructions to provide a control signal on the second output for controlling the ignition control device to limit ignition at a crank position before a compression top dead center on the basis of the opening of the accelerator and the revolution speed of the engine cause a control signal to be sent to the second output for controlling the ignition control device to limit advance ignition of the engine if the computed revolution cycle time is equal to or greater than the reverse revolution threshold value.

16. The engine control unit of claim 9, further comprising instructions executable on the one or more processors to provide a control signal on the second output for controlling the ignition control device to ignite normally the engine if the computed time value is less than the first reverse revolution threshold value.

17. One or more device readable mediums for controlling ignition timing of an engine, the one or more device readable mediums storing instructions which, when executed by one or more processors, cause the one or more processors to perform the device-implemented steps of:

determining a revolution speed of the engine;
determining an opening of a user-operated accelerator of the engine;
controlling an opening of a throttle of the engine on the basis of the determined opening of the accelerator information; and
limiting ignition at a crank position before a compression top dead center on the basis of the determined opening of the accelerator and the determined revolution speed of the engine.

18. An engine control device, comprising:
an engine revolution speed sensor for acquiring a revolution speed of an engine;
a vehicle speed sensor;
an accelerator opening sensor for detecting an opening of a user-operated accelerator of the engine;
a throttle opening sensor;
a water temperature sensor;
an engine control unit in electrical communication with each of the vehicle speed sensor, the accelerator opening sensor, the throttle opening sensor, the engine revolution speed sensor, and the water temperature sensor;
an electronically controlled throttle in electrical communication with the engine control unit, the engine control unit configured to control a throttle opening of the electronically controlled throttle based on input received from the accelerator opening sensor;
an ignition control device in electrical communication with the engine control unit, the engine control unit configured to provide a control signal to the ignition control device to limit ignition at a crank position before a compression top dead center based on the opening of the accelerator detected by the accelerator opening sensor and the revolution speed of the engine acquired by the engine revolution speed sensor.

* * * * *